United States Patent [19]

Shimizu et al.

[11] Patent Number: 4,924,482

[45] Date of Patent: May 8, 1990

[54] DATA-TRANSMITTING APPARATUS

[75] Inventors: Giichiro Shimizu; Misao Shimizu; Hajime Takeuchi; Toshiharu Okuyama; Yoshio Wakatsuki, all of Tokyo, Japan

[73] Assignee: Man Design Co., Ltd., Tokyo, Japan

[21] Appl. No.: 346,360

[22] Filed: Apr. 28, 1989

Related U.S. Application Data

[63] Continuation-in-part of Ser. No. 111,673, Oct. 23, 1987, abandoned.

[30] Foreign Application Priority Data

Jan. 22, 1987 [JP] Japan ............................ 62-12701

[51] Int. Cl.$^5$ .............................................. H03C 3/00
[52] U.S. Cl. ...................................... 375/65; 332/101; 340/870.26; 375/62
[58] Field of Search ............... 340/870.26, 870.18, 340/825.73; 332/100, 101; 455/110, 112; 375/62, 65, 66, 9, 45, 51

[56] References Cited

U.S. PATENT DOCUMENTS

| | | | |
|---|---|---|---|
| 3,205,441 | 9/1965 | Likel | 375/65 |
| 3,417,332 | 12/1968 | Webb | 375/65 |
| 3,663,754 | 5/1972 | Hanna, Jr. | 375/65 |
| 4,068,199 | 1/1978 | Madoff | 375/65 |
| 4,192,007 | 3/1980 | Becker | 375/62 |
| 4,428,073 | 1/1984 | Verburgt | 340/870.26 |
| 4,547,751 | 10/1985 | Nakata et al. | 375/62 |
| 4,730,183 | 3/1988 | Crowe | 340/870.26 |

FOREIGN PATENT DOCUMENTS 2339889 3/1974 Fed. Rep. of Germany .
3736903 11/1987 Fed. Rep. of Germany .
906390 9/1962 United Kingdom .
923955 4/1963 United Kingdom .

OTHER PUBLICATIONS

Nachrichtentechnik, "Datenübertragung über das 220-V-Netz", Dipl.-Ing. (FH) Reiner Kunzel, *Elektronik*, 20, Oct. 7, 1973, pp. 100–104.
Texas Instruments TMS70C42/70C02 Publication, pp. 47–49, 1986.

*Primary Examiner*—Benedict V. Safourek
*Attorney, Agent, or Firm*—Nixon & Vanderhye

[57] ABSTRACT

The analog data representing a value measured of a product by means of a measuring device such as a vernier calipers is converted into digital data by an analog-to-digital converter. A CPU incorporates the digital data into a data message. The CPU is driven by a clock signal output from a quartz crystal oscillator. A first frequency divider divides the clock signal, thus generating a signal of a first frequency, and a second frequency divider divides the clock signal, thereby generating a signal of a second frequency. During the duration of each digital data signal at the "0" (low) level, the CPU generates a signal at the "low" or "high" level, in accordance with the signal generated by the first frequency divider. Similarly, during the duration of each digital data signal at the "1" (high) level, the CPU generates a signal at the "low" or "high" level, in accordance with the signal generated by the second frequency divider. The signals generated by the CPU are supplied to a transmitter. The transmitter transmits these signals to an external apparatus, in the form of a radio message.

16 Claims, 10 Drawing Sheets

DATA-TRANSMITTING APPARATUS

This is a continuation-in-part of application Ser. No. 07/111,673, filed 23 October 1987, now abandoned.

BACKGROUND OF THE INVENTION

The present invention relates to a data-transmitting apparatus for transmitting digital data representing various physical or chemical quantities measured by measuring devices, and more particularly, to a data-transmitting apparatus which converts such data into a serial-data message formed of signals, frequency-modulates these signals, and transmits the frequency-modulated signals.

In a factory, products are subjected to various inspections. An inspection line is provided in the factory to inspect the products. Measuring devices of various types are arranged along the inspection line. As the products are moved in the inspection line, their physical or chemical quantities are measured by means of the measuring devices. Pieces of data representing the physical or chemical quantities measured by the devices are collected in a host apparatus. The data collected in the host apparatus is used to calculate the quality and yield of the products.

There are various kinds of inspection performed on the products. One of them is the size-measuring of products. When the products have a complicated shape, ten or more dimensional values must be measured of each product. One person may use vernier calipers to measure all these dimensional values. Usually, however, several persons use vernier calipers or similar measuring devices, each person measuring a few dimensional values. This method is preferred, since the work efficiency is higher, and the error rate is lower, than when each person measures all dimensional values of the product. Hence, many measuring devices of the same type are required in most cases.

Data representing the values measured by the measuring devices is supplied through cables to, and is collected in, the host apparatus of a data collecting system. The data must be digital, or it cannot be processed in the host apparatus. Recently, a measuring device containing an analog-to-digital (A/D) converter has been put to practical use. The device measures a value of an article, and the A/D converter converts the data representing this value to digital data. The digital data is transmitted via cables from the device to the host apparatus. Since the data signals are digital, they are not attenuated, or degraded by noise. Hence, errors in the accuracy of the data can be minimized.

This digital data representing the value measured by the measuring device is frequency-modulated before it is transmitted to the host apparatus. More specifically, each digital data signal at "0" level is converted to a pulse signal of frequency F1, whereas each digital data signal at "1" level is converted to a pulse signal of frequency F2 higher than frequency F1. The data-transmitting apparatus used in the data collecting system outputs n pulses during period T for transmitting a "0" level, and m pulses during period T for transmitting a "1" level, where n<m.

In order to perform the frequency modulation, the measuring device further contains two oscillators, one for generating pulses at frequency F1, and the other for generating pulses at frequency F2. The output pulses of these oscillators are transmitted under the control of an analog switch which is changed over in accordance with the levels of the digital data signals.

The measuring device, which a person holds in his or her hand and use to measure a value of an article, must be as small and light as possible. Since the device contains a battery for a power source, the power consumption of the device should be reduced to a minimum. Therefore, it is desired that the device be made of as few components as possible.

Each oscillator has a resonant circuit comprised of a capacitor and a resistor, or a capacitor and a coil. Hence, the measuring device, which is provided with two oscillators, is inevitably large and heavy, and is likely to consume much power.

The measuring device has another drawback. The resonant circuit (i.e., either oscillator), which is comprised of a capacitor and a resistor, or a capacitor and a coil, does not have a sufficient frequency stability. Thus, there is a high probability that the data is distorted and then transmitted. To reduce this probability, the oscillation frequency of either oscillator can be controlled by a phase-locked loop. The use of the phase-locked loop renders the measuring device even larger and heavier.

SUMMARY OF THE INVENTION

It is accordingly the object of the present invention to provide a data-transmitting apparatus which has a simple circuit structure, which is hence small and light, and which consumes a minimum amount of power.

To attain this object, a data-transmitting apparatus of this invention comprises an analog-to-digital (A/D) converting means for converting analog data to digital data formed of digital data signals at a first level and digital data signals at a second level, said analog data representing a value measured of an article by means of a measuring device; microcomputer means for forming a serial-data message formed of digital data signals supplied from the A/D converting means; clock signal-generating means for generating a clock signal for driving the microcomputer means; first signal-generating means for generating a signal of a first frequency from the clock signal generated by the clock signal-generating means, in response to the digital data signals at the first level; second signal-generating means for generating a signal of a second frequency from the clock signals generated by the clock signal-generating means, in response to the digital data signals at the second level; and transmitting means for transmitting the signals of the first and second frequencies, which have been generated by the first and second signal-generating means.

DETAILED DESCRIPTION OF THE PREFERRED EMBODIMENT

Figure 1:
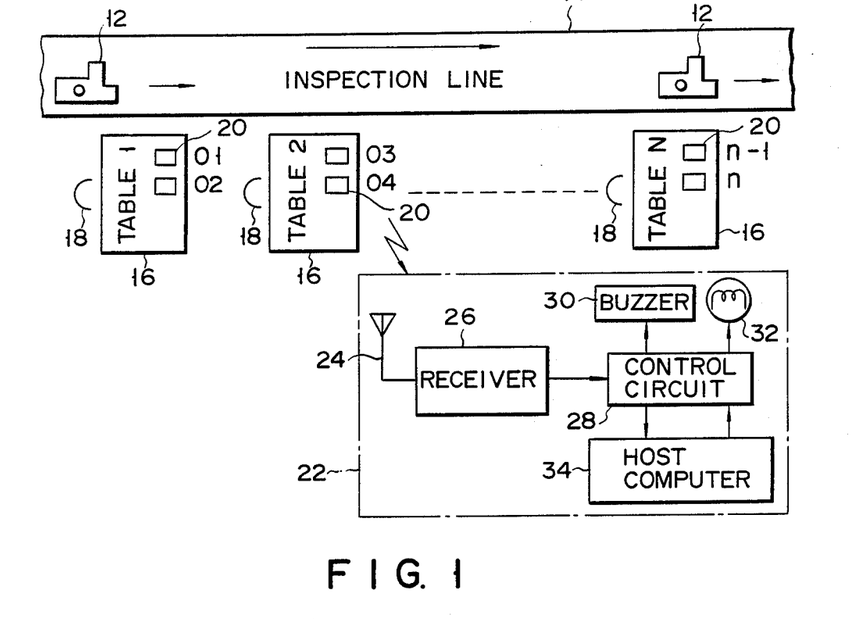
FIG. 1 s a diagram showing a data-collecting system, in which a data-transmitting apparatus of this invention is incorporated.
Figure 2:
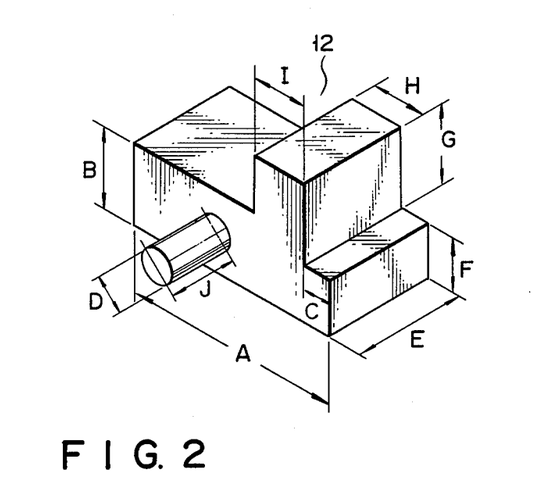
FIG. 2 is a perspective view of a product whose dimensional values can be transmitted by the data-transmitting apparatus of the invention.

FIG. 1 schematically illustrates a data-collecting system provided with a data-transmitting apparatus, i.e., an embodiment of the present invention. The data-collecting system is designed to collect the values measured of products 12 moving along inspection line 14 in the direction of arrows. Products 12 have such a shape as is shown in FIG. 2. Dimensional values A to J of each product 12 will be measured.

A plurality of tables 16 are provided along inspection line 14. Persons 18 stand at these tables 16, one person at one table. Some measuring devices 20 are placed on each table 16. Devices 20 are vernier calipers and the like. An identification (ID) number is assigned to each measuring device 20. The tusk of each person 18 is to use measuring devices 20 to measure only the dimensional value or values. Work robots may be used to manipulate devices 20, thereby to automatically measure values A to J of each product 12. As will be described later, in detail, each device 20 can transmit a data message containing the dimensional value measured of each product 12, in the form of a radio message.

Host apparatus 22 is provided which is remote from inspection line 14. Apparatus 22 comprises antenna 24, receiver 26, control circuit 28, buzzer 30, alarm lamp 32, and host computer 34. Antenna 24 catches the radio message output from any measuring device 20, and supplies the message to receiver 26. The message is supplied from receiver 26 via control circuit 28 to host computer 34. Host computer 34 determines whether or not the radio message contains an error. If an error is found in the message, control circuit 28 drives buzzer 30 and alarm lamp 32, thereby demonstrating the error. Host computer 34 can collect the dimensional values contained in the radio messages supplied to receivers 26, and can analyze these values.

Figure 3A:
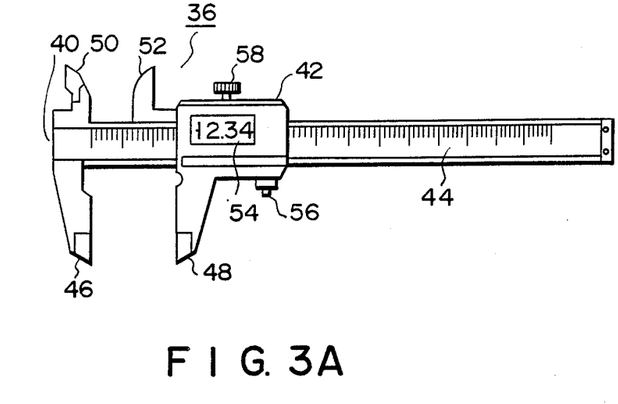
FIG. 3A is a front view of vernier calipers which can be used as a measuring device for measuring the dimensional values of the product shown in FIG. 2.
Figure 3B:
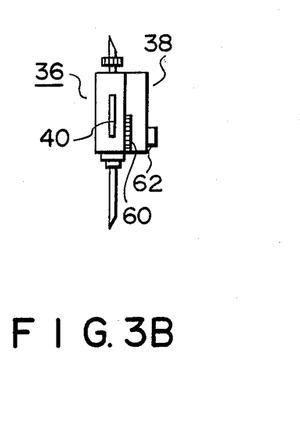
FIG. 3B is a side view of the vernier calipers shown in FIG. 3A.

FIGS. 3A and 3B show vernier calipers which can be used as measuring device 20 in the data collecting system described above. As is shown in these figures, vernier calipers is comprised of caliper unit 36 and control unit 38. Caliper unit 36 includes main scale 40 and slider 42 having display 54. Control unit 38 is attached to the back of slider 42, and comprises several components as will be described later.

Main scale 40 of caliper unit 36 has graduated plate 44. A capacitor strip is embedded within this graduated plate 44. An electrode is attached to the inner surface of slider 42, and slides on the capacitor strip when slider 42 is moved in sliding contact with main scale 40. Hence, as slider 42 is moved, the capacitance delivered from this electrode changes. The changes of this capacitance can be converted into the distance between jaws 46 and 48 fixed to main scale 40 and slider 42, respectively, or into the distance between bills 50 and 52 secured to main scale 40 and slider 42, respectively. This distance, i.e., a dimensional value measured by vernier calipers, is displayed by display 54 which is a liquid-crystal display.

As is shown in FIG. 3A, transmission button 56 is provided on the finger-rest of slider 42, and screw 58 is engaged in a screw hole cut in slider 42. Screw 58 is turned to fasten slider 42 to main scale 40. Multidigit dip-switch 60 is attached to one side of control unit 38, and can be operated to set the ID number of vernier calipers. Power-supply switch 62 is fixed to the back of control unit 38.

Figure 4:
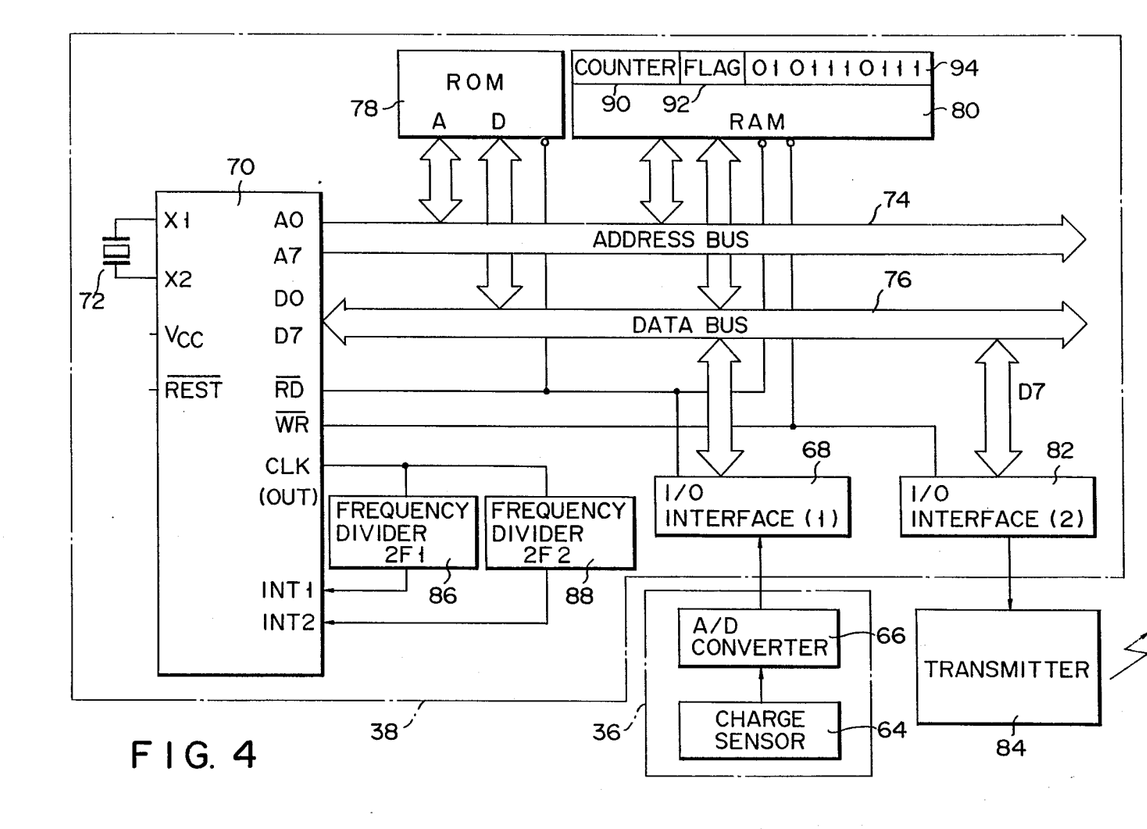
FIG. 4 is a block diagram showing the data-transmitting apparatus, i.e., an embodiment of the present invention.

FIG. 4 is a block diagram showing the datatransmitting apparatus according to one embodiment of the present invention. As is shown in this figure, caliper unit 36 contains charge sensor 64 and analog-to-digital (A/D) converter 66. Charge sensor 64 comprises the capacitor embedded in graduated plate 44 of main scale 40, and the electrode attached to slider 42. Sensor 64 outputs DC analog signal representing the value measured by the person by means of vernier calipers 20. A/D converter 66 converts the analog signal to a digital value. The digital value is displayed by display 54 and also input to input/output (I/0) interface 68 of control unit 38.

CPU 70, which can process 8-bit data, is provided within control unit 38. CPU 70 has clock terminals X1 and X2. Quartz crystal oscillator 72 is connected to these clock terminals X1 and X2. Oscillator 72 has an oscillation frequency of, for example, 6 MHz. CPU 70 contains a frequency divider (not shown) which divides the output frequency of oscillator 72 by 2, thus providing a clock signal having a frequency of 3 MHz. The 3 MHz clock signal is used to control CPU 70.

CPU 70 also has address terminals A0 to A7 and data terminals D0 to D7. Address bus 74 is connected to address terminals A0 to A7, and data bus 76 is coupled to data terminals D0 to D7. ROM 78 storing fixed data such as control programs is coupled to address bus 74 and also to data bus 76. Further, RAM 80 for storing variable data such as the values measured by vernier calipers 20 is coupled to address bus 74 and data bus 76. I/0 interface 68 is connected to data bus 76. Data bus 76 includes eight lines for supplying eight data signals, respectively. Of these eight data lines, only the eighth data line, which is coupled at one end to data terminal D7, is connected to the data terminal of I/0 interface 82 also provided within control unit 38. Transmitter 84 is coupled to this I/O interface 82.

CPU 70 further has read terminal RD and write terminal WR. CPU 70 supplies a read control signal via read terminal RD to ROM 78, RAM 80 and I/0 interface 68, when necessary. It supplies a write control signal through write terminal WR to RAM 80 and I/0 interface 82, when required.

CPU 70 also has clock output terminal CLK(OUT) and interruption terminals INT1 and INT2. The 3 MHz clock signal is supplied through terminal CLK(OUT) to first and second frequency dividers 86 and 88, both provided within control unit 38. First frequency divider 86 divides the frequency of the clock signal, thereby generating a signal which is to be transmitted and whose frequency 2F1 is twice as high as first frequency F1. Second frequency divider 88 divides the frequency of the clock signal, thus generating a signal which is to be transmitted and whose frequency 2F2 is twice as high as first frequency F1. In this embodiment, F1 is 1300 Hz, and F2 is 1700 Hz. The output signal of first frequency divider 86 is input to interruption terminal INT1 of CPU 70. The output signal of second frequency divider 88 is input to interruption terminal INT2 of CPU 70.

First and second frequency dividers 86 and 88 can be provided within CPU 70, so that their output signals are used to initiate interruptions.

As is shown in FIG. 4, RAM 80 has counter 90, flag area 92, and transmission buffer 94. Counter 90 is used to count pulses produced during period T1 for transmitting a "0" or during period T2 for transmitting a "1", thereby determining number CN of pulses. Flag area 92 is provided to store an output-level flag showing the level of any data signal transmitted by the data-transmitting apparatus. Transmission buffer 94 is used to store a data message representing the value measured of any product 12.

Although not shown in FIG. 4, transmission button 56 and dip-switch 60 are connected to CPU 70. The ID number set by operating dip-switch 60 is also stored in RAM 80. A battery and a power supply circuit (either not shown) are incorporated in control unit 38. Power is supplied from the battery via the power supply circuit to the electronic components of control unit 38 when power-supply switch 62 is closed.

Person 18 uses vernier calipers 20 in the following way. First, person 18 turns on power-supply switches 62 of, for example, the vernier calipers 20. Then, he or she operates dip-switch 60, thereby setting the ID number of vernier calipers 20. The ID number is stored in RAM 80. The ID number remains stored in RAM 80 until power-supply switch 62 is turned off, or until dip-switch 60 is operated to set a different ID number.

After setting the ID number, person 18 measures that dimensional value of product 12, which should be measured by means of calipers 20 whose ID number has been set. More specifically, person 18 inserts product 12 into the gap between jaws 46 and 48 of caliper unit 36, and moves slider 42 until product 12 is pinched between jaws 46 and 48. As slider 42 is moved, the digital value showing the distance between jaws 46 and 48 and displayed by display 54 changes continuously. The moment that product 12 is pinched between jaws 46 and 48, person 18 pushes transmission button 56, whereby the data message showing the dimensional value measured of product 12 is transmitted from transmitter 84.

Figure 5:
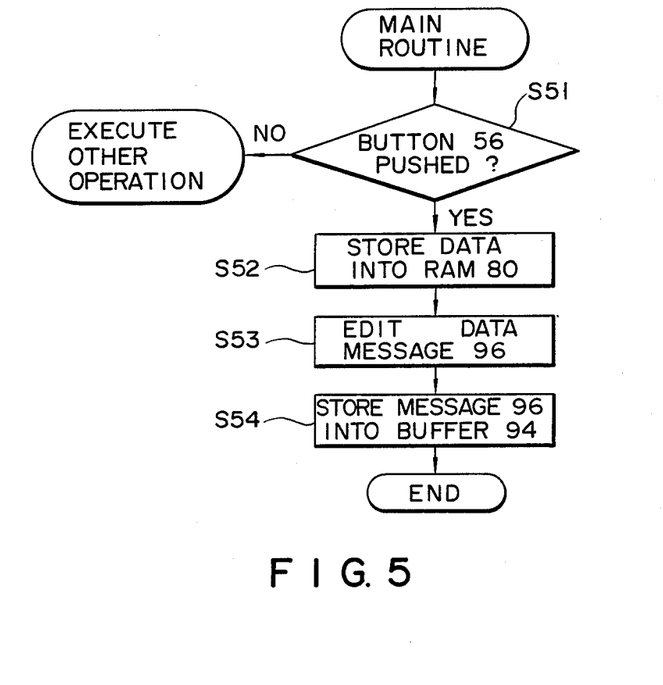
FIG. 5 is a flow chart explaining the main routine which a CPU executes, and also explaining the operation of the embodiment of the invention.
Figure 6:
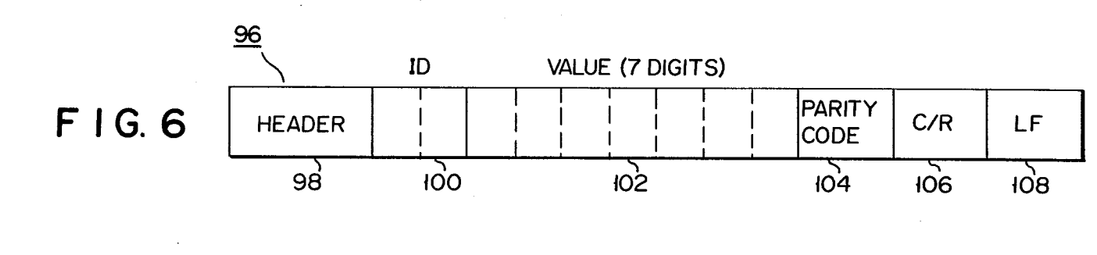
FIG. 6 is a diagram showing the format of a data message containing the values measured of the product shown in FIG. 2.

CPU 70 of control unit 38 executes the main routine as is shown in the flow chart of FIG. 5. First, it determines whether or not transmission button 56 has been pushed (Step S51). When it is determined that button 56 has been pushed, the digital data input to I/0 interface 68 is stored as correct digital data in RAM 80 (Step S52). Then, the digital data and the ID number are edited into such a data message 96 as is schematically shown in FIG. 6 (Step S53). As is shown in FIG. 6, this data message 96 is formed of header 98, 2-digit ID number 100, 7-digit measured value 102, parity code 104, carriage-return (C/R) code 106, and line-feed (LF) code 108. Header 98 is a prescribed code representing that the message contains the value measured by vernier calipers 20. One digit of the 7-digit measured value 102 may contain a decimal point. Parity code 104 is used to check an error made in transmitting the message from transmitter 84. C/R code 106 indicates that data message 96 is a complete one.

Data message 96 thus formed is stored into transmission buffer 94 provided in RAM 80 (Step S54). CPU 70 causes transmitter 84 to transmit data message 96 stored in transmission buffer 94. Person 18, who holds vernier calipers 20, functions as a transmitting antenna.

Figure 7:
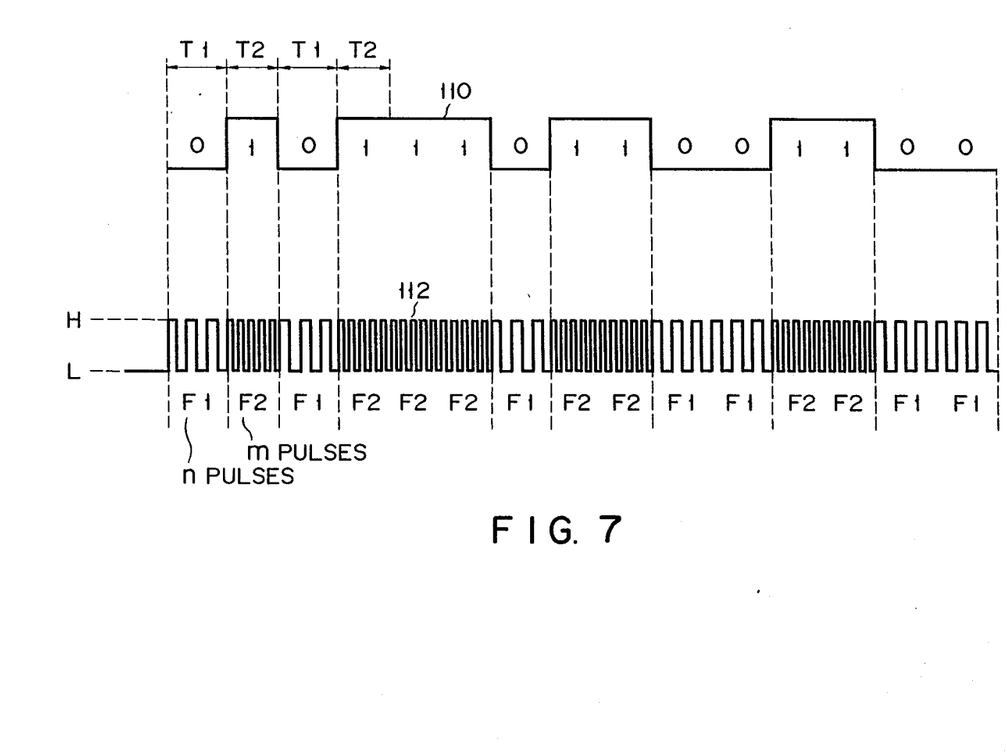
FIG. 7 is a timing chart representing the relationship between the data signals forming the data message of FIG. 6 and the frequency-modulated signal representing the data message

FIG. 7 is a timing chart illustrating the relationship between the digital data signals 110 contained in data message 96 stored in transmission buffer 94, on the one hand, and the frequency-modulated signals output from transmitter 84, on the other hand. As may be understood from FIG. 7, digital signals 110, which are at "0" (low) level, are converted to frequency-modulated signals 112 of low frequency F1, whereas digital signals 110 at "1" (high) level, are converted to frequency-modulated signals 112 of high frequency F2. More specifically, each digital signal 110 at "0" level is changed to signal 112 including n pulses during period T1 whereas each digital signal 110 at "1" level is changed to signal 112 including m pulses during period T2, where n is less than m.

Figure 8:
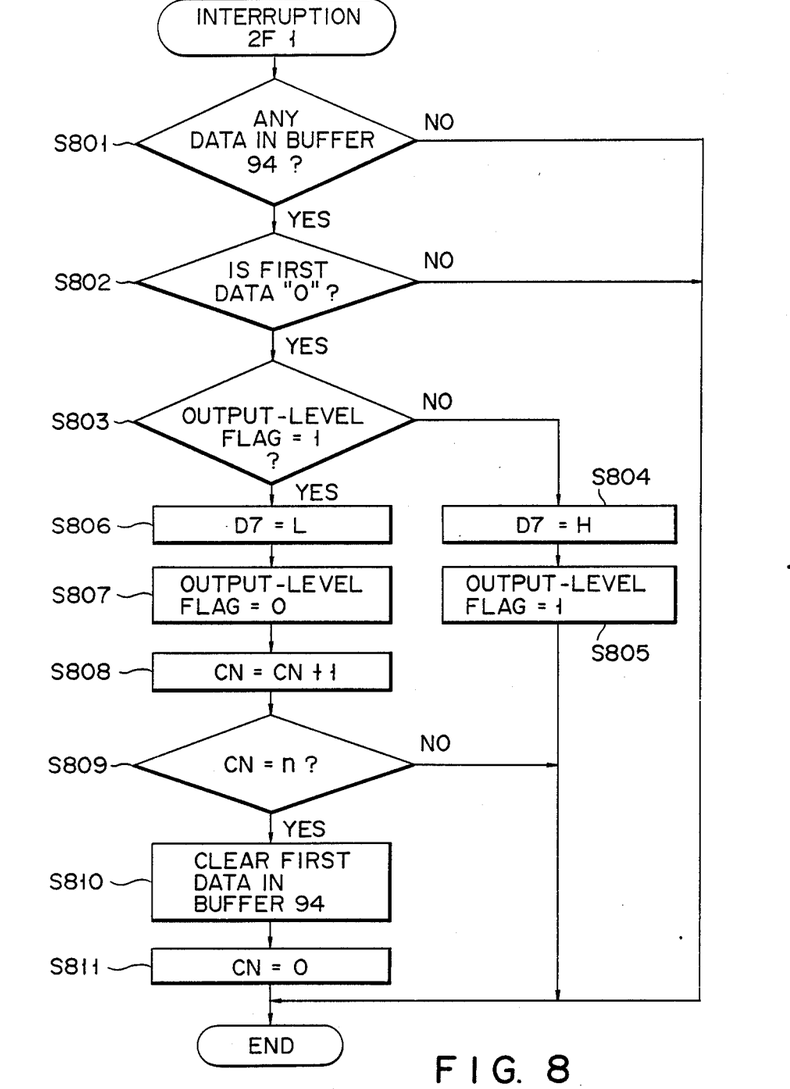
FIGS. 8 and 9 are flow charts explaining the interruption executed by the CPU, and also illustrating the operation of the embodiment of the present invention.
Figure 9:
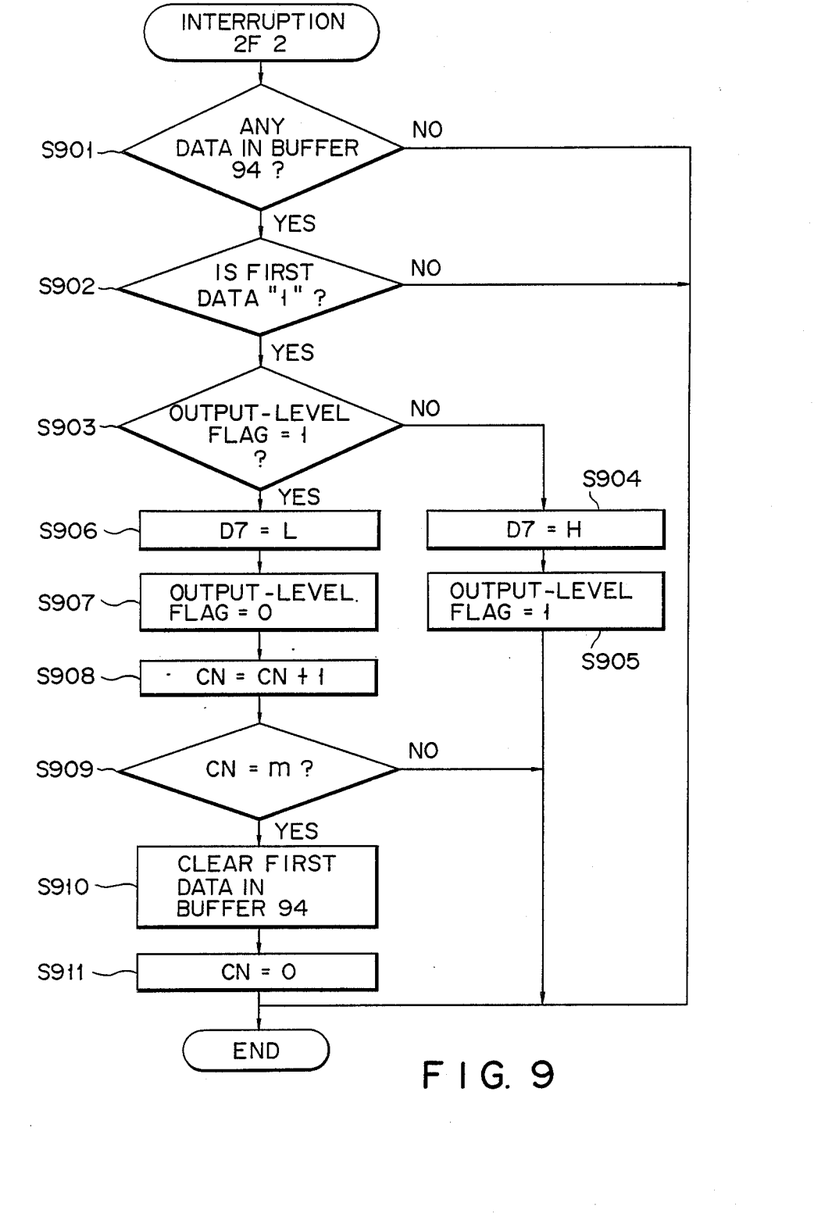

This frequency-modulation is accomplished by interruption operation performed by CPU 70 as is illustrated by the flow charts of FIGS. 8 and 9.

First frequency divider 86 supplies a pulse every 1/2F1 seconds to interruption terminal INT1 of CPU 70. (F1 is 1300 Hz). In response to the pulses output from first divider 86, CPU 70 executes the interruption operation in the specific manner represented by FIG. 8. That is, upon receipt of the pulses from divider 86, CPU 70 determines whether or not transmission buffer 94 stores any data message that is to be transmitted (Step S801). When a data message is stored in buffer 94, CPU 70 determines whether the first data is "0" or not (Step S802).

When the first data is "0", it is determined whether or not an output-level flag has been set in flag area 92 (Step S803). When no output-level flag has been set in flag area 92, an "H (high)" level data signal is supplied from the eighth data terminal D7 of CPU 70 to I/O interface 82 (Step S804). Then, an output-level flag of value "1" is set in flag area 92 (Step S805). CPU 70 completes the interruption operation.

In the meantime, I/O interface 82 latches the data signal at "H" level until it receives the next data signal. The data signal at "H" level is also supplied to transmitter 84. Transmitter 84 transmits this data signal at "H" level.

When it is determined instep S803 that the output-level flag has been set in flag area 92, a data signal at "L (low)" level is supplied from the eighth data terminal D7 of CPU 70 to I/O interface 82 (Step S806). Then, the output-level flag is released or changed to an output-level flag of value "0"(Step S807). In this case, transmitter 84 transmits the data signal at "L" level.

The count value CN of counter 90 is incremented by one (Step S808). Then, it is determined whether or not count value CN has reached the maximum value of n, i.e., the maximum number of pulses for period T1 (Step S809). When count value CN has not reached value n, CPU 70, completes the interruption operation. When count value CN has reached the maximum value of n, or that period T1 has expired, it is determined that one "0"

data has been transmitted. Hence, this data is erased in transmission buffer 94 (Step S810). Simultaneously, counter 90 is cleared (Step S811).

Therefore, every time an interruption pulse is input to terminal INT1 during the duration of a "0" data, the output signal of transmitter 84 is inverted. In other words, transmitter 84 outputs a signal of frequency F1 by m cycles.

When it is determined in step S801 that transmission buffer 94 stores no data message, or when the first data of the message stored in buffer 94 is "1", CPU 70 does not execute the interruption operation in reply to the pulses generated at frequency 2F1 by first frequency divider 86.

When the pulses generated by second frequency divider 88 at frequency 2F2 (F2=1700 Hz) are input to interruption terminal INT2 of CPU 70, CPU 70 executes an interruption operation in the manner represented by FIG. 9. That is, upon receipt of the pulses from second frequency divider 88, CPU 70 determines whether or not transmission buffer 94 stores any data message that is to be transmitted (Step S901). When a data message is stored in buffer 94, CPU 70 determines whether or not the first data contained in the message is "1" (Step S901).

When the first data is "1", it is determined whether or not an output-level flag has been set in flag area 92 (Step S903). When no output-level flag has been set in flag area 92, a data signal at "H (high)" level is supplied from the eighth data terminal D7 of CPU 70 to I/O interface 82 (Step S904). An output-level flag of value "1" is then set in flag area 92 (Step S905). Then, CPU 70 completes the interruption operation.

Meanwhile, I/O interface 82 latches the data signal at "H" level, until it receives the next data signal. The data signal at "H" level is also supplied to transmitter 84. Transmitter 84 transmits this data signal at "H" level.

When it is determined in step S903 that the output-level flag has been set in flag area 92, a "L" (low) level data signal is supplied from the eighth data terminal D7 of the CPU 70 to I/O interface 82 (step S906). Then, the output-level flag is released—that is, it is changed to an output-level flag of value "0" (Step S907). In this case, transmitter 84 transmits the data signal at "L" level.

The count value CN of counter 90 is incremented by one (Step S908). Thereafter, it is determined whether or not count value CN has reached the maximum value of m, i.e., the maximum number of pulses for period T2 (Step S909). When count value CN has not reached value m, CPU 70 completes the interruption operation. When count value CN has reached the maximum value of m, or that period T2 has expired, it is determined that one "1" data has been transmitted. Hence, this data is erased in transmission buffer 94 (Step S910). At the same time, counter 90 is cleared (Step S911).

Therefore, every time an interruption pulse is input to terminal INT2 during the duration of a "1" data, the output signal of transmitter 84 is inverted. In other words, transmitter 84 outputs a signal of frequency F2 by m cycles.

When it is determined, in step S901, that transmission buffer 94 stores no data message to be transmitted, or when the first data of the message stored in buffer 94 is "0", CPU 70 does not execute the interruption operation in response to the pulses generated at frequency 2F2 by second frequency divider 88.

As has been explained with reference to the flow charts of FIGS. 8 and 9, any data signal 110 at "0" level is modulated with frequency F1 and then transmitted from transmitter 84. On the other hand, any data signal 110 at "1" level is modulated with frequency F2 and then transmitted from transmitter 84. As a result, a frequency-modulated data message including signals 112 modulated with frequency F1 and signals modulated with frequency F2 is transmitted from transmitter 84.

In this case, since a signal of the frequency corresponding to the next data is not output until the output of n or m pulses is completed, no discontinuity is caused when the frequency is switched from F1 to F2 or from F2 to F1.

Data message 96, thus frequency-modulated, is received by antenna 24 of host apparatus 22. It is then supplied to receiver 26 of apparatus 22. Receiver 26 demodulates data message 96 into a digital data message. The demodulated data message is supplied from receiver 26 via control circuit 28 to host computer 34.

Host computer 34 checks parity code 104 of data message 96, thus determining whether or not an error has occurred in transmitting message 96 from transmitter 84 to antenna 24. When an error has occurred, host computer 34 supplies control circuit 28 with a signal showing this fact. In this case, control circuit 28 operates buzzer 30 and alarm lamp 32, thereby demonstrating the transmission error. Hearing buzzer 30 making alarm sound, and seeing lamp 32 emitting light, person 18 uses vernier calipers 20, thus again measuring the dimensional value of product 12.

Host computer 34 contains programmed data showing the order in which dimensional values A to J should be measured of each product 12 at tables 16, programmed data representing the ID numbers of measuring devices 20 for use in measuring values A to J, and programmed data showing the tolerances for these values A to J. Host computer 34 checks the data messages 96 transmitted from measuring devices 20, in comparison with these items of programmed data. Therefore, when person 18 working at any table 16 measures a dimensional value other than the specific one which he or she should measure, when dimensional values A to J are measured in a wrong order, or when a wrong measuring device is used, host computer 34 determines that an error has been made during the inspection of product 12. Then, control circuit 28 operates buzzer 30 and alarm lamp 32, whereby an alarm is given to demonstrate this error.

When host computer 34 determines that no errors have been made, it records data message 96 on a recording medium. In other words, computer 34 collects dimensional values A to J contained in messages 96, which have been correctly transmitted from measuring devices 20 to host apparatus 22. Computer 34 analyzes the collected values (A to J), thereby determining whether or not product 12 is above a prescribed quality level, and processes values A to J measured of many products 12, thereby calculating the average quality level of these products and also the yield thereof.

Any data message 96 is transmitted from each measuring device 20 to host apparatus 22 in the specific way described above. That is, CPU 70 processes the input data (i.e., the dimensional values measured of each product 12 by means of measuring devices 20) in accordance with the program stored in ROM 78, thereby forming a serial-data message 96 containing data levels "0" and "1". Each signal with "0" level data is modulated with frequency F1, and each signal with "1" level data is modulated with frequency F2, thus providing a frequency-modulated data message. This data message is supplied to, and transmitted by, transmitter 84. Since the two pulse signals required for frequency-modulating the data message, whose frequencies are F1 and F2, respectively, are obtained by first and second frequency dividers 86 and 88 which divide the clock signal output from one oscillator 72, two oscillators for generating the pulse signals need not be provided within transmitter 84.

The electronic components, such as CPU 70, are C-MOS elements and the like, each consuming a very little power. The data-transmitting apparatus of the invention, therefore, consumes power far smaller than the conventional apparatus which is provided with two oscillators each containing a resonant circuit composed of a capacitor and a resistor, or a capacitor and a coil. Hence, it suffices to use a small-capacity battery in the apparatus of this invention. If a battery of the same capacity as that used in the conventional apparatus is used, the data-transmitting apparatus of the present invention can be used for a much longer period of time.

Further, the pulse signals of frequencies F1 and F2, both used in frequency-modulating the data signals of data message 96, are obtained by dividing the frequency of quartz crystal oscillator 72, with different frequency-dividing factors. Obviously, these pulse signals have a frequency stability far greater than the frequency stabilities of the pulse signals by the two resonant circuits incorporated in the conventional data-transmitting apparatus. As a result, the data-transmitting apparatus of the invention can reduce the probability of data-transmission errors to almost nil, and can therefore increase the reliability of the transmitted data very much.

Figure 10:
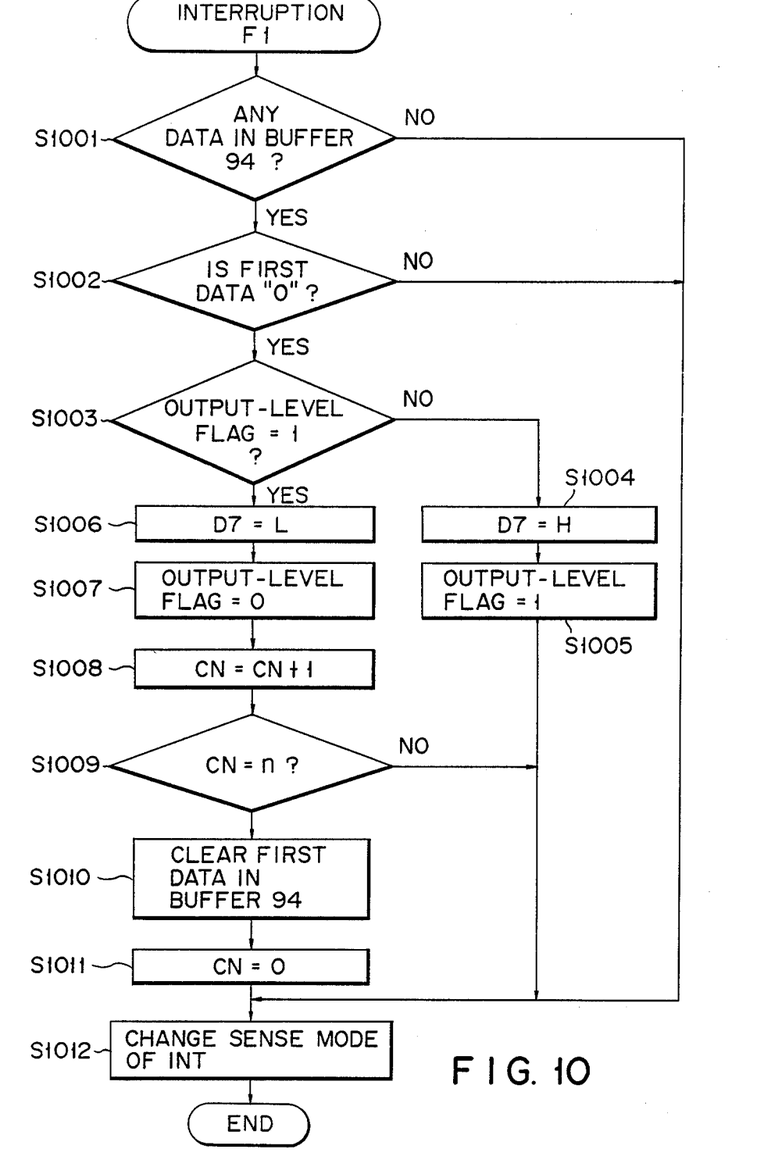
FIGS. 10 and 11 are flow charts of exemplary interrupt program control steps performed by the CPU in the preferred embodiment, and also illustrate the operation of another preferred embodiment of the present invention.
Figure 11:
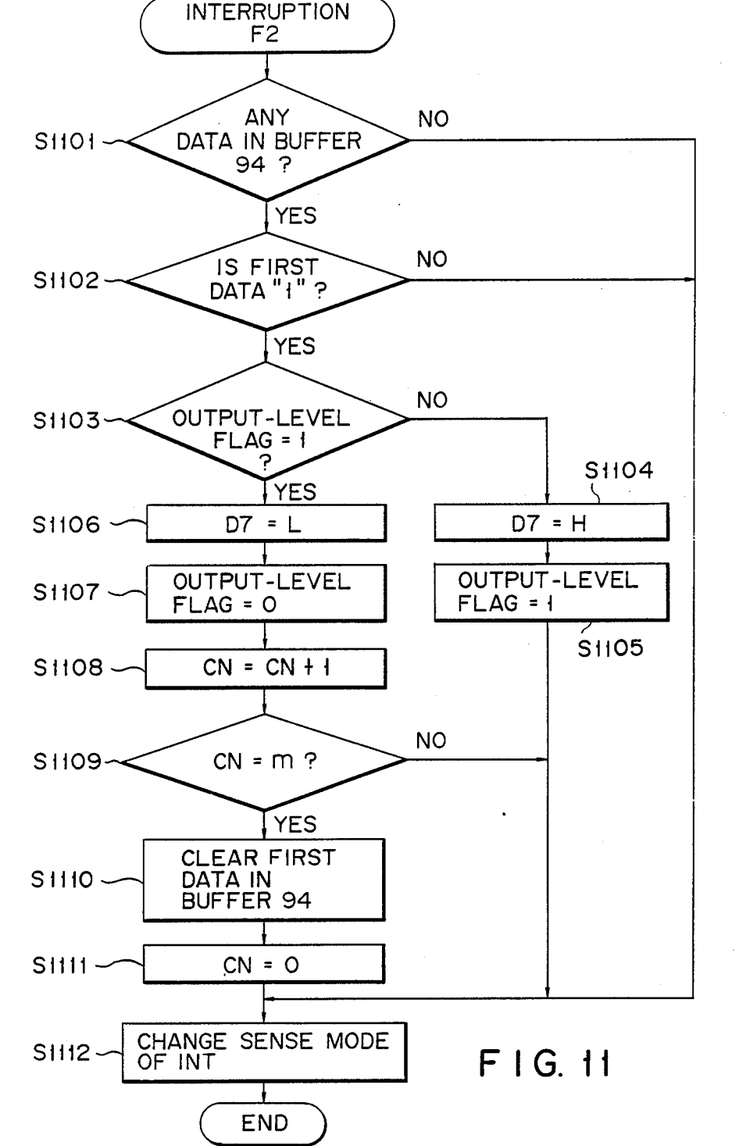

CPU 70 is described as a common CPU which is interrupted when a high or low signal is supplied to interrupt terminals INT1 and INT2. However, CPU 70 can be replaced with a CPU such as TMS70C42 manufactured by Texas Instruments (see, e.g., TI specification sheet SCJ1168 dated 1988 entitled "TMS70C42/70CO2) which is capable of selecting a "sense mode" for its interrupt input terminal. When such a CPU is used, frequency dividers 86 and 88 respectively divide an input clock signal into frequencies F1 and F2 to be transmitted. FIGS. 10 and 11 are flow charts showing the interrupt routine executed by this CPU. This interruption is obtained by adding the operations of steps S1012 and S1112 to the processing shown in FIGS. 8 and 9. In steps S1012 and S1112, the sense mode of the interrupt input terminal is switched so as to alternate a change from the interruption detection at the leading edge of an input signal to that at the trailing edge thereof and a change from the interruption detection at the trailing edge of an input signal to that at the leading edge thereof.

Figure 12:
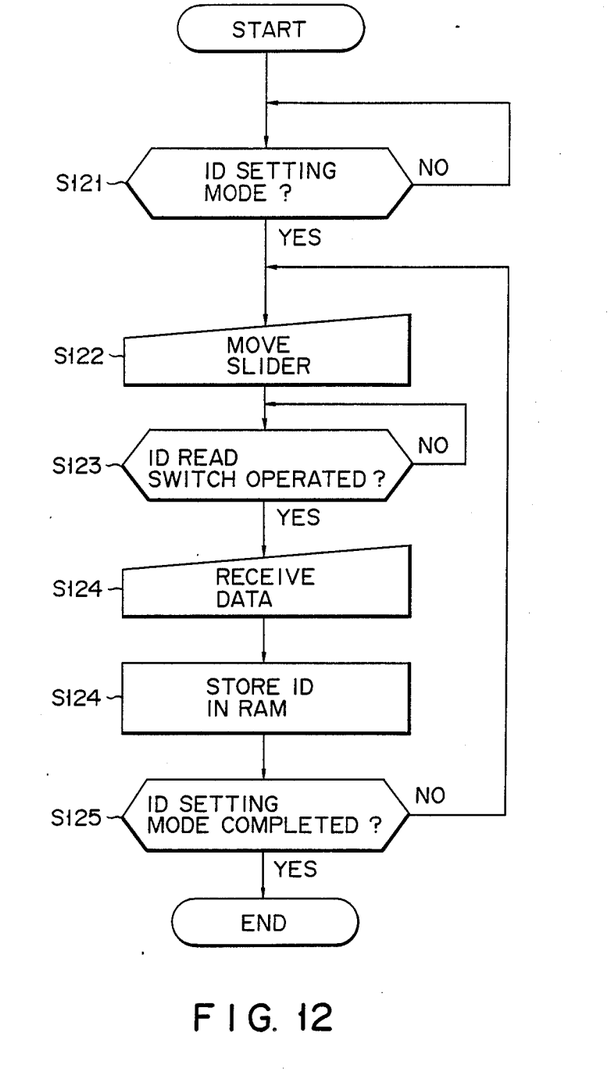
FIG. 12 is a flow chart of exemplary program control steps for setting an ID number.

Instead of the aforementioned way of setting an ID number in which a signal pattern is properly set by DIP switch 60, the following way of setting an ID number can be used. FIG. 12 is a flow chart showing exemplary program control steps for setting an ID number. A switch corresponding to a proper digit of DIP switch 60 is used as a mode selecting switch, and the operation goes to an ID number setting mode by operating the mode selecting switch (Step S121). In the ID number setting mode, any arbitrary or any predetermined numerical value is displayed on digital display 54 by moving slider 42 of a digital vernier's caliper (step S122). Now assume that some digits of a "digital display" numeral (for example, the upper two digits from "01" to "99") are initially set as the ID number on the caliper to which 99 or below are assigned as available digits. After the ID number is set by a two-digit numeral corresponding to the ID number, the switch corresponding to a proper digit of DIP switch 60 (which is used as an ID number read switch) is operated to produce an operation signal (step S123). In response to the operation signal, CPU 70 in control unit 38 reads the numerals in two digits as the ID number via I/O interface 68 (step S124), and the ID number is allowed to be stored in RAM 80 (step S125). By so doing, the ID number is set, and the switch corresponding to a proper digit of DIP switch 60 used as the mode selecting switch is returned to an original state, thereby completing the ID number setting mode.

The present invention is not limited to the embodiment described above. For instance, the data message can be output from a transmitter to the host apparatus through a cable connecting the transmitter and the host apparatus, in the form of frequency-modulated data signals.

What is claimed is:

1. A data-transmitting apparatus comprising:
   data-receiving means for receiving first and second level digital data signals;
   microcomputer means connected to said data-receiving means for generating a serial-data message containing the digital data signals received by said data-receiving means;
   clock signal-generating means for generating a clock signal;
   first signal-generating means connected to receive said clock signal for dividing the frequency of said clock signal to generate a first frequency signal;
   second signal-generating means connected to receive said clock signal for dividing the frequency of said clock signal to generate a second frequency signal;
   storage means connected to said microcomputer means for storing said serial-data message;
   said microcomputer means including serial signal generating means, connected to receive said first and second frequency signals and also connected to said storage means, for defining a plurality of sequential time periods corresponding to the digital data signal contained by said stored serial-data message, for producing a digital output signal which alternates at said first frequency in response to said first frequency signal during those time periods corresponding to said first level digital data signals, and for producing a digital output signal which alternates at said second frequency in response to said second frequency signal during those time periods corresponding to said second level digital data signals; and
   transmitting means connected to receive said produced digital output signals for transmitting said produced digital output signals to an external apparatus.

2. A data transmitting apparatus comprising:
   data-receiving means for receiving a digital data signal formed of a high and a low level signal;
   microcomputer means connected to said data-receiving means for generating a serial-data message including the digital data signal received by said data-receiving means and generating a clock signals;

first and second frequency dividing means for receiving the clock signal and generating a first digital signal of frequency $F_1$ of a high and a low levels and a second digital signal of frequency $F_2$ of a high and a low levels;

memory means connected to said microcomputer means for storing the serial-data message; and transmitting means for transmitting the signals of frequencies $F_2$ and $F_1$ output from said microcomputer means, said microcomputer means being connected to said first and second frequency dividing means and said memory means, whereby said microcomputer means discriminates between the high level and low level of the digital data signal included in the serial-data message stored in said memory means, outputs one of the signal of frequency $F_2$ supplied to said second frequency dividing means and the signal of frequency $F_1$ supplied from said first frequency dividing means based on the discrimination, and confirms whether the signal of frequency $F_2$ is output during a predetermined m period or the signal of frequency $F_1$ is output during a predetermined n period based on the discrimination; and said microcomputer means further discriminates between the high and low levels of a digital data signal to be transmitted next, outputs one of the signal of frequency $F_2$ supplied from said second frequency dividing means and the signal of frequency $F_1$ supplied from said first frequency dividing means, and confirms whether the signal of frequency $F_2$ is output during the predetermined m period or the signal of frequency $F_1$ is output during the predetermined n period; and said microcomputer means repeats the above operations.

3. The data-transmitting apparatus according to claim 2, wherein said microcomputer means includes control means for outputting a signal of frequency $F_2$ supplied from said second frequency dividing means and confirming that the signal of frequency $F_2$ is output during the predetermined m period when a digital signal to be transmitted is recognized as being at a high level, and outputting a signal of frequency $F_1$ supplied from said first frequency dividing means and confirming that the signal of frequency $F_1$ is output during the predetermined n period when the digital data signal is recognized as being at a low level.

4. The data-transmitting apparatus according to claim 3, wherein said microcomputer means includes updating means for clearing an initial digital data signal of the serial-data message stored in said memory means and converting the next digital signal included in the data message into a digital data signal whose level is to be recognized as being at a high level or a low level when said control means confirms that the signal of frequency $F_2$ is output during the predetermined m period or that the signal of frequency $F_1$ is output during the predetermined n period.

5. The data-transmitting apparatus according to claim 4, wherein said control means includes first counter means for counting the number of periods of the signal of frequency $F_2$ and second counter means for counting the number of periods of the signal of frequency $F_1$.

6. The data-transmitting apparatus according to claim 5, wherein said updating means includes first clear means for clearing an initial digital data signal of the serial-data message stored in said memory means when a value counted by said first counter means reaches m and second clear means for clearing an initial digital data signal of the serial-data message stored in said memory means when a value counted by said second counter means reaches n.

7. The data-transmitting apparatus according to claim 6, wherein said transmitting means includes wireless transmitting means for wirelessly transmitting a signal output from said microcomputer means.

8. The data-transmitting apparatus according to claim 7, wherein said data-receiving means includes analog-to-digital converting means for receiving analog data from a measuring device for measuring an object into digital data.

9. A data transmitting apparatus comprising:

data-receiving means for receiving a digital data signal formed of a high and a low level signals;

microcomputer means connected to said data-receiving means for generating a serial-data message including the digital data signal received by said data-receiving means and generating a clock signal;

first and second frequency dividing means for receiving the clock signal and generating a first digital signal of frequency $2F_1$ of a high and a low levels and a second digital signal of frequency $2F_2$ of a high and a low levels;

memory means connected to said microcomputer means for storing the serial-data message; and transmitting means for transmitting the signals of frequencies $F_2$ and $F_1$ output from said microcomputer means, said microcomputer means being connected to said first and second frequency dividing means and said memory means, whereby said microcomputer means discriminates between the high level and low level of the digital data signal including in the serial-data message stored in said memory means, outputs one of the signal of frequency $F_2$ which is half of frequency $2F_2$ supplied from said second frequency dividing means and the signal of frequency $F_1$ which is half of frequency $2F_1$ supplied from said first frequency dividing means based on the discrimination, and confirms whether the signal of frequency $F_2$ is output during the predetermined m period or the signal of frequency $F_1$ is output during the predetermined m period; and said microcomputer means repeats the above operations.

10. The data-transmitting apparatus according to claim 9, wherein said microcomputer means includes control means for outputting a signal of frequency $F_2$ which is half of frequency $2F_2$ supplied from said second frequency dividing means and confirming that the signal of frequency $F_2$ is output during the predetermined m period when a digital signal to be transmitted is recognized as being at a high level, and outputting a signal of frequency $F_1$ which is half of frequency $2F_1$ supplied from said first frequency dividing means is output during the predetermined n period when the digital data signal is recognized as being at a low level.

11. The data-transmitting apparatus according to claim 10, wherein said microcomputer means includes updating means for clearing an initial digital data signal of the serial-data message stored in said memory means and converting the next digital signal included in the data message into a digital data signal whose level is to be recognized as being at a high level of a low level when said control means confirms that the signal of frequency F2 is output during the predetermined m period or that the signal of frequency F1 is output during the predetermined n period.

12. The data-transmitting apparatus according to claim claim 11, wherein said control means includes first counter means for counting the number of periods of the signal of frequency F2 and second counter means for counting the number of periods of the signal of frequency F1.

13. The data-transmitting apparatus according to claim 12, wherein said updating means includes first clear means for clearing an initial digital data signal of the serial-data message stored in said memory means when a value counted by said first counter means reaches m and second clear means for clearing an initial digital data signal of the serial-data message stored in said memory means when a value counted by said second counter means reaches n.

14. The data-transmitting apparatus according to claim 13, wherein said transmitting means includes wireless transmitting means for wirelessly transmitting a signal output from said microcomputer means.

15. The data-transmitting apparatus according to claim 14, wherein said data-receiving means includes analog-to-digital converting means for receiving analog data from a measuring device for measuring an object into digital data.

16. A remote measuring device comprising:
   measuring means for measuring a physical parameter and for providing a digital value indicating said measured physical parameter;
   data transmitter means for transmitting signals to a remote location in response to signals applied to an input terminal thereof;
   oscillator means for generating a clocking signal;
   first frequency divider means connected to receive said clocking signal for dividing said clocking signal by a first dividing factor to provide a first frequency signal;
   second frequency dividing means connected to receive said clocking signal for dividing said clocking signal by a second dividing factor to provide a second frequency signal; and
   microprocessor means, connected to receive said digital signal, said clocking signal, and said first and second frequency signals and operatively connected to said transmitter means input terminal, for applying a serial digital output signal to said data transmitter means input terminal, said microprocessor means including:
   means for generating a digital signal message containing said digital value, said message having a first bit and a next bit,
   first interrupt routine means responsive to said first frequency signal for:
     (a1) examining the value of said first bit,
     (b1) applying said first frequency signal to said data transmitter means input terminal during a first time period if said first bit has a first value,
     (c1) examining the value of said next bit, and
     (d1) applying said first frequency signal to said data transmitter means input terminal during a further time period after said first time period if said next bit has said first value; and
   second interrupt routine means responsive to said second frequency signal for:
     (a2) examining the value of said first bit,
     (b2) applying said second frequency signal to said data transmitter means input terminal during said first time period if said first bit has a second value different from said first value,
     (c2) examining the value of said next bit, and
     (d2) applying said second frequency signal to said data transmitter means input terminal during said further time period if said next bit has said second value different from said first value.

* * * * *